Jan. 24, 1961

H. P. STAUFERT 2,969,262

BEARING FOR HIGH-SPEED SPINDLES, PARTICULARLY
FOR SPINNING AND TWISTING MACHINES

Filed April 25, 1958

INVENTOR

Helmut P. Staufert

By
Patent Agent

Jan. 24, 1961 H. P. STAUFERT 2,969,262
BEARING FOR HIGH-SPEED SPINDLES, PARTICULARLY
FOR SPINNING AND TWISTING MACHINES
Filed April 25, 1958 3 Sheets-Sheet 2

INVENTOR
Helmut P. Staufert
By
Patent Agent

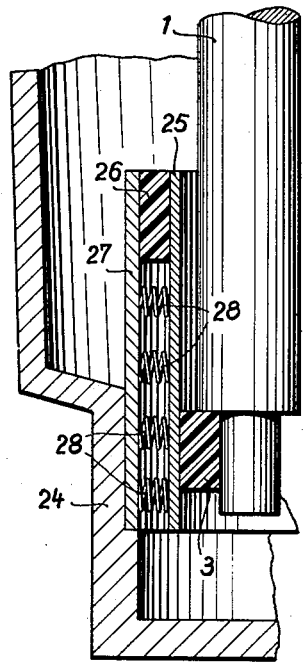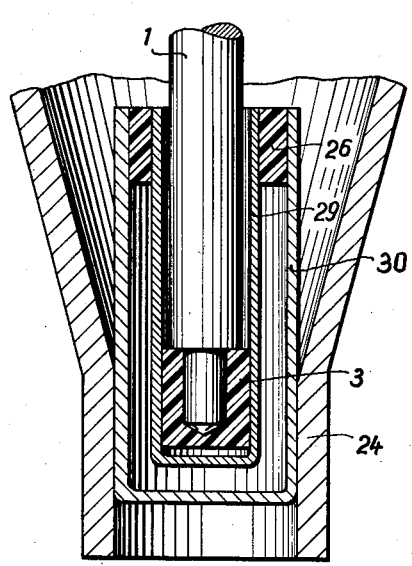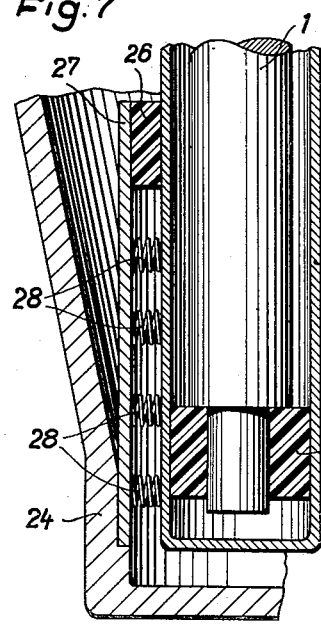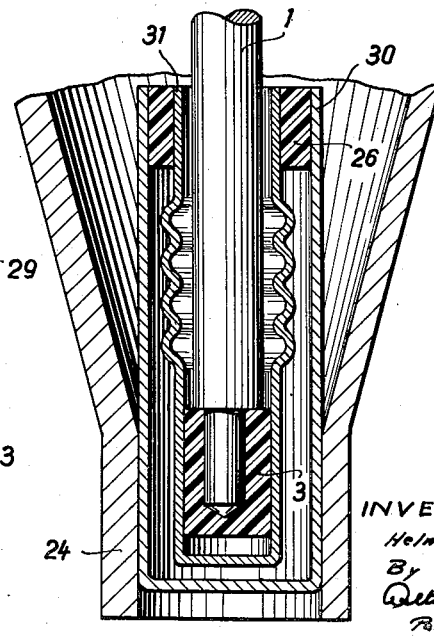

United States Patent Office 2,969,262
Patented Jan. 24, 1961

2,969,262

BEARING FOR HIGH-SPEED SPINDLES, PARTICULARLY FOR SPINNING AND TWISTING MACHINES

Helmut P. Staufert, Holbeinweg 40, Stuttgart N, Germany

Filed Apr. 25, 1958, Ser. No. 731,593

Claims priority, application Germany Apr. 27, 1957

3 Claims. (Cl. 308—152)

The present invention relates to improvements in bearings for high-speed spindles, particularly spinning and twisting spindles, consisting of a head bearing and a lower-end thrust or foot bearing, in addition to means for damping the vibrations of such spindles.

The known bearing structures of this type comprising head and foot bearings mounted in a housing and also provided with damping means, usually had bearing housings made of either a single part or multiple parts in which the head and foot bearings were mounted, and in which the vibration dampers generally consisted of bearing sleeves or spring suspensions of various types operating in combination with a suitable oil. Most of the known designs preferred a direct connection between the actual bearing chamber of the spindle and the chamber reserved to hold the vibration damping agent, so that, for example, the oil used for lubricating the spindle bearings could emerge from the foot bearing and also fill the damping chamber. If different types of oil were used for lubrication and for damping, the damping agent was of a type similar to the lubricant, for example, a thicker oil or grease. Regardless, however, which of these designs was used, the removal of any such spindle bearing from the housing, for example, by pulling out the bearing sleeve or the foot bearing resulted in a change of the damping volume. As soon as the bearing sleeve or the thrust bearing was removed from the bearing housing, portions of the damping medium were also taken along by the outer surfaces of the bearing part just removed, no matter whether the oil was a thick or thin oil, a grease, or any other oil-like substance. When the previously removed bearing portions were again installed after having been cleaned, checked, or repaired, it could never be safely assumed that the chamber serving to hold the damping agent would again contain the same quantity of damping agent as previously, or if refilled, that the same quantity would again be filled in, since the damping agent usually had to be filled in before the individual parts of the bearing were installed. Therefore, there was no actual guarantee that, following a disassembly, for example, for the purpose of cleaning, and the subsequent reassembly, all of the spindles of one machine would contain the same volume of damping agent. In addition thereto, the damping agents used in spindle bearings of the known designs were always uncontrollably influenced by moisture and chemical substances contained in the surrounding air, all of which caused the damping conditions to change.

Further, if, for example, after an over-all repair job, the respective machine was to be put back into service under changed operating conditions, the spindle bearings too had to be refitted to meet the new demands. In many cases, this was only possible by time-consuming and expensive refitting of the bearing components, and if in such a case the lubricant and the damping agent were one and the same material, the damping action was always dependent upon the lubricant since the latter in the first place had to meet the requirements for an adequate lubrication.

It is an object of the present invention to overcome these known disadvantages and to provide a bearing structure, in particular for spinning and twisting spindles which may be adapted to meet the various demands occurring in actual practice.

According to the invention this object may be attained by providing at least one adequate chamber for receiving the damping agent and by designing this chamber so as to form an integral part of the respective bearing. One preferred embodiment of the invention provides that the chamber serving to hold the damping agent is hermetically sealed toward the outside by means of the component holding the actual bearing. This may be carried out by providing the foot bearing or the head bearing with a chamber for holding the damping agent. It is also possible to provide a separate hermetically sealed chamber both at the foot and neck bearings for receiving the same kind or different kinds of damping agents, or to provide at the foot and neck bearings a hermetically sealed chamber which extends from one bearing to the other for receiving the damping agent.

According to another feature of the invention, the chamber holding the damping agent is preferably provided with sealing means permitting gaseous, liquid or granular damping materials to be filled into the chamber.

A further feature of the invention consists in providing between the outer portion and the inner portion of the chamber holding the damping agent a single connecting means for centering, for the axial and radial control of the position of the components in relation to each other, as well as for balancing of the masses. Any kind of damping agent may be provided between the outer and inner portions. A very preferred embodiment of the invention may be attained by designing the connecting means so as also to serve as damping means. The bearing chamber formed by the inner component is preferably sealed relative to the damping chamber. It is also possible to seal the bearing chamber and the damping chamber relative to each other by the use of the connecting means.

These and further objects, features, and advantages of the present invention will appear in greater detail from the following description thereof, particularly when read with reference to the accompanying drawings, in which—

Figures 4 and 5 show two further modifications of foot bearings in accordance with the invention; while Figures 6 to 9 show still further modifications of foot bearings according to the invention.

Figure 1:
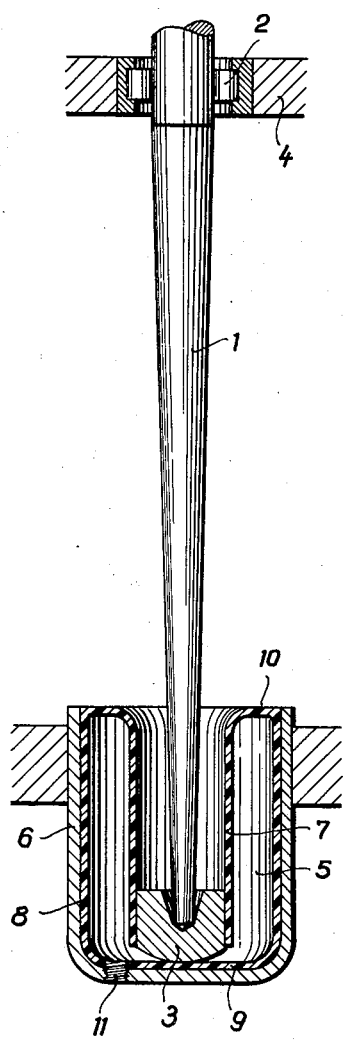
Figure 1 shows a longitudinal section of a permanently installed head bearing, and a separate removable foot or thrust bearing according to the invention.

In the accompanying drawings, Figure 1 shows a spindle shaft 1 as being mounted in the conventional manner by means of a head bearing 2 and a foot bearing 3. The head bearing 2 is permanently secured in a rail 4 in a heretofore known manner. In such a case any vibrations which might occur will be transmitted to the foot bearing 3, requiring the latter to be provided with proper damping means in order to balance any such vibrations. For this purpose, the invention provides the foot bearing 3 to be surrounded by a hollow body 5, which together with the foot bearing 3 may be inserted, for example, into a supporting and mounting tube 6. The hollow body 5 consists of a suitable elastic plastic material and is designed so that its inner wall 7 firmly encloses the outer peripheral surface of foot bearing 3. Depending upon the kind of plastic employed, this may be easily achieved by heating or by a cold-vulcanizing process, or by surrounding the foot bearing 3 with the plastic either by casting or spraying in a suitable mold. The outer wall 8 of the hollow body 5 extends parallel to and spaced from the inner wall 7 in such a manner that the outer wall 8 of the hollow body 5 will fit tightly against the inner wall of the supporting tube 6. The foot bearing 3 will then be disposed in the hollow body 5 so as to be axially supported by the latter's bottom surface 9. The inner wall 7, the outer wall 8, and the bottom surface 9 of the hollow body 5, together with the top wall 10, form a composite element, the inner cylinder of which is hermetically sealed toward the outside by the foot bearing 5. In this manner, a self-contained sealed hollow body 5 is formed, the inner chamber 5 of which serving as a damping chamber is completely sealed from the oil used for lubricating the bearing. By this arrangement of a completely sealed chamber which has no communication with the area containing the actual foot bearing 3, the damping agent will now no longer be required to be an oil of a type which is primarily suited for lubrication of the bearings, and instead any other substance which might be better suited for damping may be employed, or in other words, the damping agent is no longer required to be of the same type or species as the lubricant, but it may even be of an entirely different type. Thus, the damping agent may be gaseous, such as compressed air, or liquid, such as thick oil, or any other viscous substance and it may even be granular, such as fine sand, or consist of mixtures of such materials. Obviously, such damping agent may also be employed in connection with mechanical damping means of any known type. In this manner, the damping agent may be any material best suited to meet the respective demands, since it is no longer dependent upon the lubricant used for the bearings. Thus, for example, it is possible to fill the hollow body 5 in the factory with a damping agent which complies with certain predetermined load conditions. Since in such a case the foot bearing 3 which is fitted into the hollow body 5 forms a sealing element of the hollow body, the entire structure may be manufactured as an integral unit. Such unit may then be marked at the outside, for example, at the bottom surface 9 or at the top wall 10 of the hollow body 5, with a designation stating the kind of damping agent employed and the respective limits within which the hollow body with the filled-in damping agent may be used, for example, at a weight of 10,000 t./min. up to 1 kg. The invention, as illustrated in Figure 1, may also be modified in that the hermetically sealed damping chamber may be made accessible by means of a suitable plug or, for example, a valve 11. If the sealing member of the hollow body 5 is designed so that a special tool would be required for its operation, which would be available only to certain authorized personnel, there may thus be adequate assurance that the chamber within the hollow body 5 holding the damping agent cannot normally be tampered with. In this manner it may also be insured that a damping chamber which is set for a certain load will maintain its characteristics until certain changes are made by the person who is authorized to do so and who is in possession of the special tool required for the operation of valve 11 or of the lock. If the hollow bodies prepared in this manner either by the manufacturer or by the authorized operator are inserted into the supporting tube 6, there is an absolute certainty that there will be no changes in the damping agent, no matter whether the hollow body 5 is removed from its support for the purpose of changing the bearing oil and for simultaneously cleaning the same, or for a check of the thrust bearing, or for any other purpose. There is a definite guarantee that there will be no changes due to a general clean up or by the operators of the machines. However, there will always be a possibility to adapt the spindle bearing according to the invention to entirely different loads, for example, if the manufactured product is being changed or the rate of speed is to be considerably increased, or yarn cops of entirely different weights are to be used.

If, under certain operating conditions it should be insufficient to provide a damping chamber merely at the foot bearing, a similar provision may also be made at the head bearing. This is illustrated, for example, in Figure 2, in which the spindle shaft 1, the head bearing 2, the foot bearing 3, the rail 4, the hollow body 5, and the supporting tube 6 are of substantially the same construction as in the embodiment according to Figure 1. Only the hollow body 5 has a slightly different shape, in that the foot bearing 5 does not extend all the way to the bottom of the hollow body 5, as illustrated in Figure 1, but is suspended within the hollow body 5. The head bearing 2 is mounted within a hollow body 12 which extends between the outer wall of the head bearing 2 and the inner wall of a supporting tube 13 in a manner similar to the supporting tube 6. The hollow body 12 is similarly designed as the hollow body 5 illustrated in Figure 1, and embodies the same advantages. In spite of the substantially identical design of the two hollow bodies, their damping chambers may be filled either with the same or different damping agents.

Figure 2:
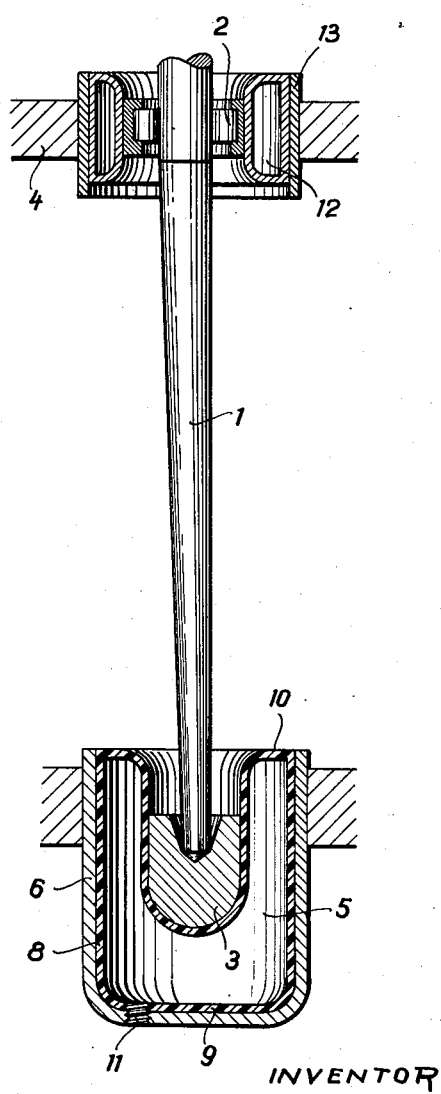
Figure 2 shows a longitudinal section of a removably installed head bearing and a separate removable foot bearing in accordance with the invention.
Figure 3:
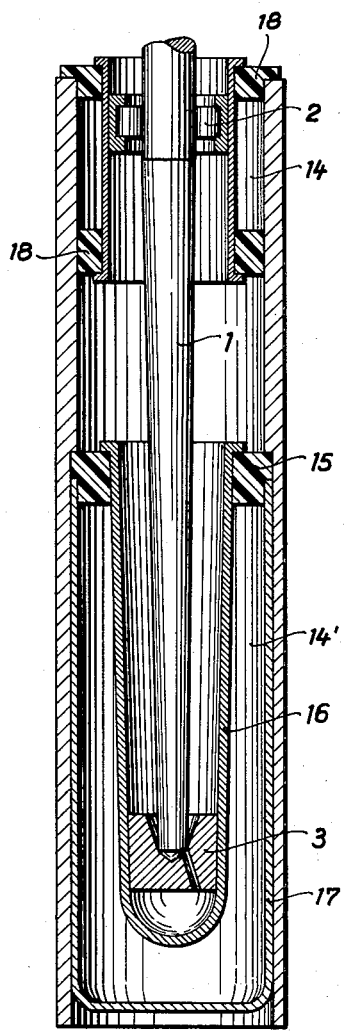
Figure 3 shows a modification of a head and foot bearing according to the invention in a common mounting.

In principle, Figure 3 illustrates the same embodiment as Figure 2, except for the fact that the head bearing and the foot bearing are housed in a common mounting. In this embodiment, the hollow cylinders which surround the damping chambers 14 and 14' consist of metal and are connected by locking or sealing means which permit the damping agents to act in hermetically sealed chambers. The foot bearing has one single sealing member 15, which interconnects the cup-shaped hollow bodies 16 and 17, while the head bearing has two sealing members 18 which close off the two tubes so as to form a hermetically closed damping chamber.

It is also possible to combine the separate damping chambers for the foot or head bearings, as illustrated in Figure 3, so as to form a single damping chamber.

Figure 4:
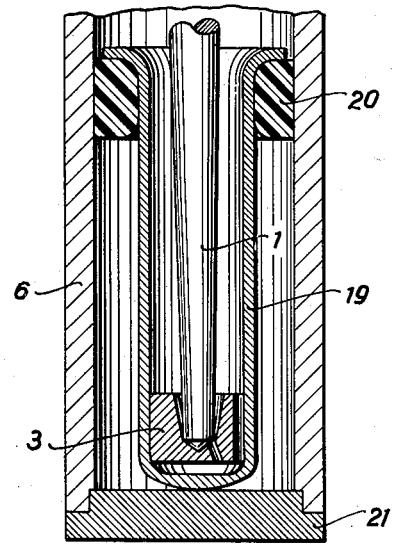
Figure 5:
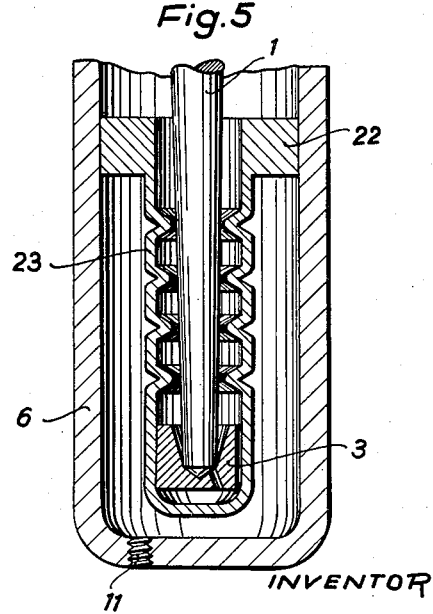

Figures 4 and 5 illustrate two further embodiments of the present invention. According to Figure 4 the spindle shaft 1 rotates in the foot bearing 3 which is embedded in the cup-shaped insert 19. This cup 19 may consist, for example, of metal which is molded by pressing so as to have a smooth surface. It has a diameter smaller than the inner diameter of the supporting tube 6, with the result that a damping chamber will be formed between the outer wall of the cup insert 19 and the inner wall of the supporting tube 6. At its upper end the damping chamber is closed by means of an annular plug 20 which is designed as to permit damping movements. At its lower end the damping chamber is provided with a solid closing member 21, the inner surface of which may be used to support the cup insert 19. If required, the closing member 21 may be provided with an opening through which the damping agent may be filled into the damping chamber and which may thereafter be securely sealed by a fixed or removable plug.

Figure 5 shows a similar embodiment as illustrated in Fig. 4, but with the difference that in this case the closing member 22 at the upper end of the damping chamber is fixedly connected with the supporting tube 6, while the cup insert 23 is movable within itself, for example, by being provided with pressed-in corrugations, permitting the cup insert to follow the movements of the damping agent.

In addition to the embodiments as described above and illustrated in the drawings, the spindle bearing according to the invention may also be designed in such a manner that only the head bearing has a chamber in the shape of a hollow body to receive the damping agent, while the foot bearing remains rigid.

The present invention may also be applied to foot bearings which are mounted in a stationary part of the machine as illustrated, for example, in Figures 6 to 9. In these cases, the spindle shaft 1 is likewise mounted in a foot bearing 3 which may be of any preferred design. The entire bearing arrangement is mounted in a stationary part 24 of the machine.

According to Figure 6, the foot bearing 3 is inserted into the inner part 25. In this case, the inner part 25 forms a tubular member which is open toward the bottom and connected with the outer part 27 by means of a connecting member 26. The outer part 27 is also a tubular member which is rigidly secured to part 24. In this manner, the spindle shaft 1 is accurately centered relative to the foot bearing 3, and in addition both the radial and the axial positions of the components in relation to each other will be maintained, apart from the fact that the masses will also be balanced if vibrations should occur. For this purpose, small helical compression springs 28 may, for example, be inserted between the inner part 25 and the outer part 27 and be distributed along the periphery thereof. In addition, there is, of course, the possibility of making the connecting member 26 itself in the form of a damping element. In such a case, the bearing chamber formed by the inner part 25 would not be sealed relative to the damping chamber. It will then also be possible to use the lubricant as a damping agent.

Figure 7 shows still a further modification in which the foot bearing 3 is inserted in a cup-shaped inner part 29, while the connecting member 26, the outer part 27, and the compression springs 28 are provided in a similar manner as in the embodiment according to Figure 6. The bearing chamber formed by the inner part 29 is thus sealed relative to the damping chamber. In this manner it is possible to apply different materials to serve as a lubricant and as a damping agent, respectively. Another embodiment of the invention which is still more preferred for the above-mentioned purpose is illustrated in Figure 8. In this case, the inner part 29 is likewise of a cup-like shape and connected by a connecting member 26 with an outer part 30, also of a cup-like shape. Both the bearing chamber formed by the inner part 29 and the damping chamber formed between the inner part and the outer part are thus sealed against the atmosphere, so that any type of damping agent may be filled into the damping chamber without coming into any contact with other parts of the bearing.

Figure 9 shows an embodiment similar to that illustrated in Figure 3, except for the fact that in this case the inner part 31 is also designed to act as a damping means, as indicated, for example, by the corrugated tubing. Pressed-in grooves may, of course, also be employed in place of the corrugations.

It will thus be seen that the present invention may be applied to a multitude of different constructions. It is not only possible to manufacture new spindles in this manner, but also to redesign available spindles in a very simple manner and to adapt them to the respective purpose, since all embodiments of the invention may be supplied as factory-made units. In this manner, it is easily possible to exchange the complete bearing units as self-contained structural components, in the event that a replacement is required or if the employment of the respective machine for a different purpose requires a different type of bearing arrangement for the spindle.

Although the invention has been illustrated and described with reference to the preferred embodiments thereof and to their use in spinning and twisting machines, I wish to have it understood that it is in no way limited to the details of such embodiments or to such use, but is capable of numerous modifications within the scope of the appended claims, as well as to be applied to other types of bearings and bearings for other types of machines.

Having thus fully disclosed my invention, what I claim is:

1. In combination in a bearing system for spinning and twisting spindles: a first cup-shaped member, bearing means mounted in said cup-shaped member for journalling the lower end of a spindle, a second cup-shaped member substantially coaxially surrounding said first cup-shaped member in spaced relationship thereto and confining therewith an open end chamber of U-shaped cross section, sealing means hermetically sealing the open end of said chamber, vibration damping substance in said chamber, said chamber with said damping substance and said sealing means forming a single unit of a certain vibration damping characteristic, and supporting means exchangeably supporting said unit and permitting withdrawal of said unit as an entirety from said supporting means.

2. In combination in a bearing system for spinning and twisting spindles: a first cup-shaped member, bearing means mounted in said cup-shaped member for journalling the lower end of a spindle, a second cup-shaped member substantially coaxially surrounding said first cup-shaped member in spaced relationship thereto and confining therewith an open end chamber of U-shaped cross section, said first cup-shaped member having a corrugated wall, sealing means hermetically sealing the open end of said chamber, vibration damping substance in said chamber, said chamber with said damping substance and said sealing means forming a single unit of a certain vibration damping characteristic, and supporting means exchangeably supporting said unit.

3. In combination in a bearing system for supporting the lower end of spinning and twisting spindles: supporting means, vibration damping means exchangeably mounted in said supporting means and comprising a cup-shaped outer portion and a tubular inner portion substantially coaxial with said cup-shaped outer portion but arranged in spaced relationship thereto, the upper end of said tubular inner portion being integral with the adjacent portion of said cup-shaped outer portion while the lower end of said tubular inner portion is open, bearing means resting on the bottom of said cup-shaped outer portion and hermetically sealing the open lower end of said tubular inner portion so that said tubular inner portion together with said bearing means and said cup-shaped outer portion forms a hermetically sealed container, and vibration cushioning substance hermetically enclosed in said container.

References Cited in the file of this patent

UNITED STATES PATENTS

| | | |
|---|---|---|
| 405,233 | White | June 11, 1889 |
| 600,634 | Coirin | Mar. 15, 1898 |
| 2,097,797 | Magrath | Nov. 2, 1937 |
| 2,155,919 | Wooler et al. | Apr. 25, 1939 |
| 2,202,746 | Raboisson | May 28, 1940 |
| 2,614,896 | Pierce | Oct. 21, 1952 |